United States Patent Office 3,190,920
Patented June 22, 1965

3,190,920
1-ORTHO-LOWER ALKYL - PHENYL - 1 - PHENYL-2 LOWER ALKYL - 3 - DILOWERALKYLAMINO -1- PROPANOLS
Robert Geoffrey William Spickett, Harpenden, and Horace Frederick Ridley, St. Albans, England, assignors, by mesne assignments, to Smith Kline & French Laboratories, Philadelphia, Pa., a corporation of Pennsylvania
No Drawing. Filed May 7, 1962, Ser. No. 192,998
Claims priority, application Great Britain, May 19, 1961, 18,380/61
2 Claims. (Cl. 260—570)

This invention relates to new diphenylpropanolamines having pharmacodynamic activity. More specifically, the compounds of this invention have diuretic, anticonvulsant and central nervous system stimulant activity. These compounds exhibit antiamphetamine, antitremorine and antihistamine activity and in addition are blockers of conditioned response. The compounds of this invention are useful as antidepressant agents.

The novel diphenyl propanolamines of this invention are represented by the following structural formula:

FORMULA I

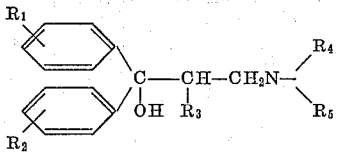

when:

$R_1$ and $R_2$ are different and are selected from the group consisting of hydrogen, lower alkyl, lower alkoxy and halogen such as fluoro, chloro and bromo;
$R_3$ is lower alkyl; and
$R_4$ and $R_5$ are lower alkyl or, when taken together with the N atom to which they are attached, pyrrolidino and piperidino.

Preferred compounds of this invention are represented by the following structural formula:

FORMULA II

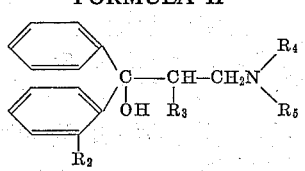

when $R_2$, $R_3$, $R_4$ and $R_5$ are lower alkyl.

The terms "lower alkyl" and "lower alkoxy" where used herein denote groups having 1-4 carbon atoms, preferably 1-2 carbon atoms.

This invention also includes pharmaceutically acceptable, nontoxic, acid addition salts of the above defined bases formed with nontoxic organic and inorganic acids. Such salts are easily prepared by methods known to the art. The base is reacted with an excess of organic or inorganic acid in a lower alkanol solvent, such as methanol or, preferably, ethanol, with isolation of the salt by filtration. Exemplary of such organic salts are those with maleic, fumaric, ascorbic, succinic, methanesulfonic, ethanedisulfonic, acetic, tartaric, salicylic, citric, lactic, malic, benzene sulfonic and theophylline acetic acids as well as with the 8-halotheophyllines, for example 8-bromotheophylline. Exemplary of such inorganic salts are those with hydrochloric, hydrobromic, sulfuric, phosphoric and nitric acids. Of course, these salts may also be prepared by the classical method of double decomposition of appropriate salts which is well-known to the art.

The compounds of this invention according to Formula I above are prepared by reacting an α-lower alkyl-β-aminopropiophenone with an appropriately substituted phenyl lithium or Grignard reagent. The reaction is preferably carried out in dry ethereal solution at elevated solution at elevated temperature, conveniently the reflux temperature of the solution, for about 8-24 hours. The reaction is preferably carried out in an atmosphere of nitrogen. The mixture is worked up by pouring it onto ice, separating the ethereal layer, extracting with dilute hydrochloric acid, neutralizing the acid extracts, extracting into ether, removing the ether solvent and distilling to give the substituted diphenylpropanolamines of this invention.

The α-lower alkyl-β-aminopropiophenone starting materials are prepared by Mannich reaction of an appropriately substituted-phenyl lower alkyl ketone with formaldehyde and an amine.

In practice, the compounds of this invention will normally be administered internally as pharmaceutical preparations in the form of, for example, tablets, capsules, powders, cachets, pills or syrups. The pharmaceutical preparations may, in addition to the active compound, contain suitable pharmaceutical diluents or carriers.

The following examples are not limiting but are illustrative of the compounds of this invention and will serve to make fully apparent all of the compounds embraced by the general formulas given above.

*Example 1*

To a stirred and cooled solution of o-tolyl lithium (prepared from 10.8 g. of o-bromotoluene and 0.9 g. of lithium in 50 ml. of dry ether) is added a solution of 9.0 g. of α-methyl-β-dimethylaminopropiophenone in 25 ml. of dry ether. The resulting mixture is refluxed for 14 hours in an atmosphere of nitrogen. The mixture is poured onto ice and the resulting ethereal layer is separated, washed with water and extracted with dilute hydrochloric acid. The acid extracts are neutralized and extracted with ether. The ether is removed in vacuo and the residue is treated in ethanol solution with hydrochloric acid to give 1-o-tolyl-1-phenyl-2-methyl-3-dimethylamino-1-propanol hydrochloride.

*Example 2*

An ether solution of 19.1 g. of α-methyl-β-pyrrolidinopropiophenone is added to a stirred and cooled solution of 12.2 g. of o-tolyl lithium in ether. The mixture is refluxed for 12 hours under nitrogen. Working up as in Example 1 gives 1-o-tolyl-1-phenyl-2-methyl-3-pyrrolidino-1-propanol which when treated with ethanolic hydrochloric acid yields the hydrochloride salt.

*Example 3*

A solution of 10.8 g. of α-methyl-β-pyrrolidinopropiophenone in 30 ml. of dry ether is added to 6.1 g. of p-tolyl lithium in ether and the resulting mixture is heated at reflux for 15 hours under nitrogen. After working up as in Example 1, there is obtained 1-p-tolyl-1-phenyl-2-methyl-3-pyrrolidino-1-propanol.

*Example 4*

An ether solution of 11.0 g. of 3-dimethylamino-4'-methoxy-2-methylpropiophenone is added to 6.0 g. of o-tolyl lithium in ether. The mixture is heated at reflux for 14 hours and worked up as in Example 1 to give 1-p-methoxyphenyl-1-o-tolyl-2-methyl-3-dimethylamino-1-propanol.

*Example 5*

To 3.3 g. of p-tolyl lithium in ether is added 5.5 g. of 3 - dimethylamino-4'-methoxy-2-methylpropiophenone in ether. After refluxing for 15 hours and working up as in Example 1, 1 - p - methoxyphenyl-1-p-tolyl-2-methyl-3-dimethylamino-1-propanol is obtained.

Example 6

Following the procedure of Example 1 and using p-tolyl lithium prepared from 10.8 g. of p-bromotoluene and 0.9 g. of lithium in 50 ml. of dry ether and 9.0 g. of α-methyl-β-dimethylaminopropiophenone there is obtained 1-p-tolyl-1-phenyl-2-methyl-3-dimethylamino-1-propanol.

Similarly using m-tolyl lithium and p-methoxyphenyl lithium in the procedure of Example 1, 1-m-tolyl-1-phenyl-2-methyl-3-dimethylamino-1-propanol and 1-p-methoxyphenyl-1-phenyl-2-methyl-3-dimethylamino-1-propanol respectively are obtained.

Example 7

A mixture of 8.1 g. of dimethylamine hydrochloride, 0.25 ml. of concentrated hydrochloric acid, 4.5 g. of paraformaldehyde, 30 ml. of ethanol and 16.8 g. of p-chloropropiophenone is refluxed for 1.5 hours, 3.0 g. of paraformaldehyde is added and the refluxing is continued for two hours. Boiling acetone is added to the mixture and the resulting solution is cooled. The precipitate is filtered off to give 4'-chloro-2-methyl-3-dimethylaminopropiophenone.

An ether solution of 11.2 g. of 4'-chloro-2-methyl-3-dimethylaminopropiophenone is added to 5.2 g. of phenyl lithium in ether. After refluxing for 14 hours in an atmosphere of nitrogen and working up as in Example 1, 1-p-chlorophenyl-1-phenyl-2-methyl-3-dimethylamino-1-propanol is obtained.

Example 8

By the procedure of Example 7 butyrophenone is reacted with formaldehyde and dimethylamine by the Mannich reaction to give 2-ethyl-3-dimethylaminopropiophenone.

Refluxing 2-ethyl-3-dimethylaminopropiophenone with o-tolyl lithium in ether as in Example 1 gives 1-o-tolyl-1-phenyl-2-ethyl-3-dimethylamino-1-propanol.

Similarly reacting pentyl phenyl ketone with formaldehyde and piperidine gives 2-butyl-3-piperidinopropiophenone which is refluxed with o-tolyl lithium to give 1-o-tolyl-1-phenyl-2-butyl-3-piperidino-1-propanol.

In the same manner butyrophenone is reacted with formaldehyde and piperidine to give 2-ethyl-3-piperidinopropiophenone which on refluxing with o-tolyl lithium gives 1-o-tolyl-1-phenyl-2-ethyl-3-piperidino-1-propanol.

Example 9

By the procedure of Example 1, o-butylphenyl lithium in ether is treated with α-methyl-β-diethylaminopropiophenone. The resulting mixture is refluxed for 20 hours and worked up to give 1-o-butylphenyl-1-phenyl-2-methyl-3-diethylamino-1-propanol.

Example 10

To a cooled solution of 6.1 g. of o-tolyl lithium in ether is added an ether solution of 14.4 g. of 4'-butoxy-2-methyl-3-pyrrolidinopropiophenone. Refluxing the resulting mixture for 15 hours under nitrogen and working up as in Example 1 gives 1-p-butoxyphenyl-1-o-tolyl-2-methyl-3-pyrrolidino-1-propanol.

Example 11

By the procedure of Example 1, O-chloro-phenyl magnesium bromide in dry ether is treated with α-methyl-β-dimethylaminopropiophenone. The resulting mixture is allowed to stand for 24 hours at room temperature and worked up to give 1-O-chlorophenyl-1-phenyl-2-methyl-3-dimethylamino-1-propanol.

What is claimed is:

1. A chemical compound of the class consisting of a free base and salts with pharmaceutically acceptable acids, the free base having the formula:

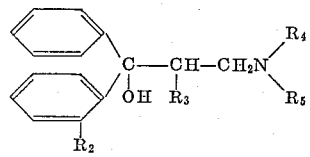

in which $R_2$, $R_3$, $R_4$ and $R_5$ are lower alkyl.

2. A chemical compound of the formula:

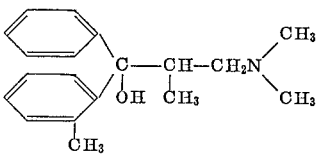

References Cited by the Examiner

UNITED STATES PATENTS

| | | | |
|---|---|---|---|
| 2,835,676 | 5/58 | Sprague et al. | 260—570 X |
| 2,989,533 | 6/61 | Stein et al. | 260—570 X |

FOREIGN PATENTS

| | | |
|---|---|---|
| 178,163 | 4/54 | Australia. |
| 525,752 | 6/56 | Canada. |
| 627,139 | 7/49 | Great Britain. |
| 815,217 | 6/59 | Great Britain. |

OTHER REFERENCES

Morrison et al., "Jour. Chem. Soc. London," 1950, pages 1510–13.

CHARLES B. PARKER, *Primary Examiner.*

L. ZITVER, *Examiner.*